Feb. 3, 1959      C. A. SCHURR      2,872,633
ELECTRIC MOTOR RESONANT CONTROL CIRCUIT
Filed March 6, 1957
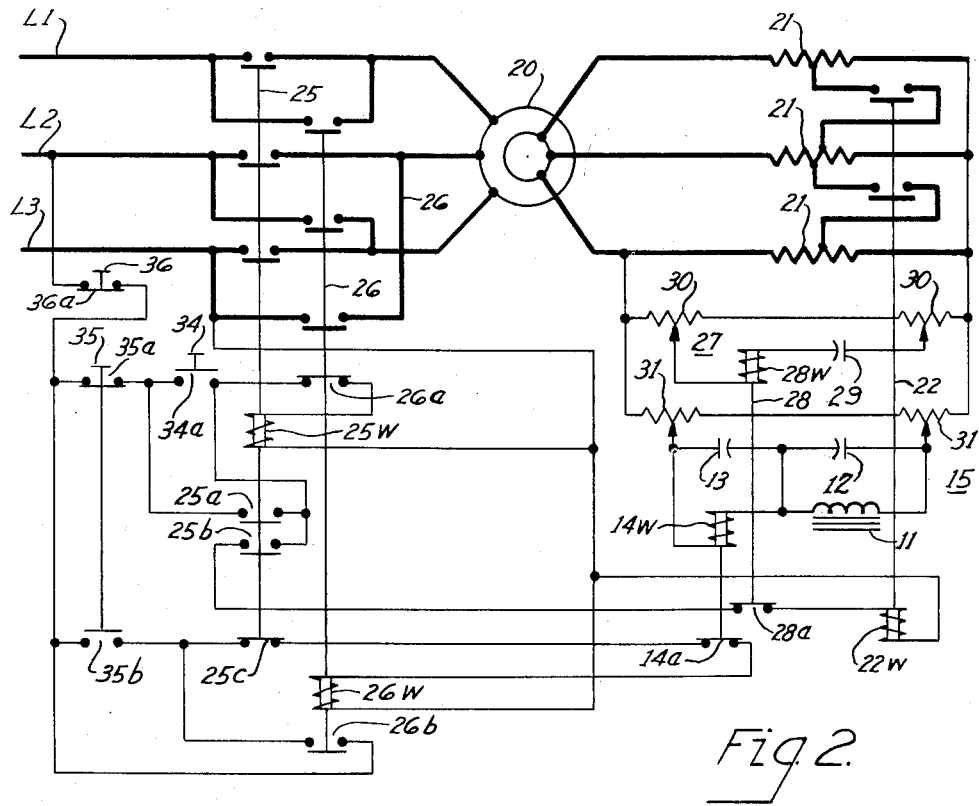
Fig. 2.
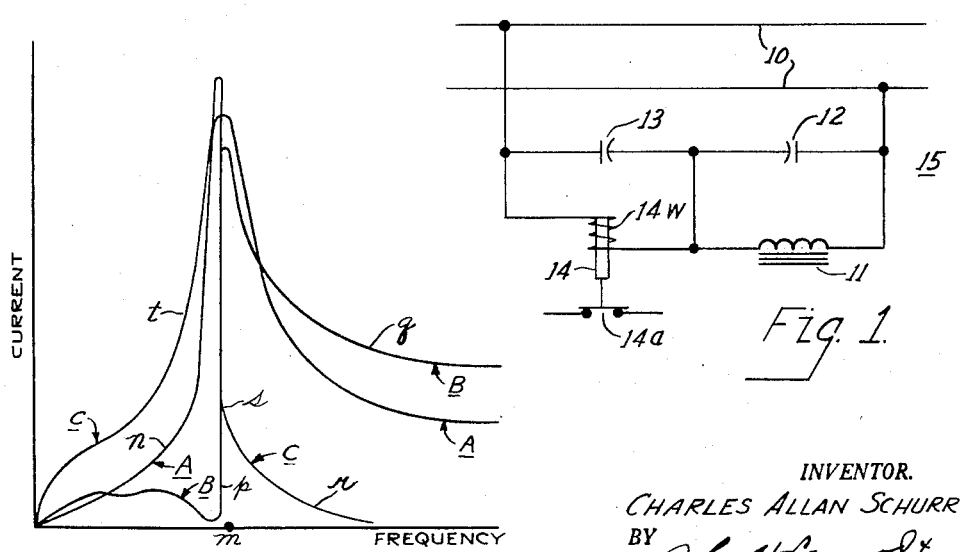
Fig. 3.
Fig. 1.
INVENTOR.
CHARLES ALLAN SCHURR
BY
ATTORNEYS.

United States Patent Office 2,872,633
Patented Feb. 3, 1959

2,872,633

ELECTRIC MOTOR RESONANT CONTROL CIRCUIT

Charles Allan Schurr, Warrensville Heights, Ohio, assignor to Square D Company, Detroit, Mich., a corporation of Michigan Application March 6, 1957, Serial No. 644,364

4 Claims. (Cl. 318—249)

This invention relates to electrical control circuits, and more particularly to electrical control circuits which depend upon the phenomena of series and parallel resonance for their operation.

Although useable for other applications, the invention is shown and described herein, for illustrative purposes only, as applied to the control of a wound rotor induction motor. Embodiments of the invention in connection with other electrical devices are apparent from the illustrated example and will not be specifically described.

Under normal operating conditions, the flux in the air gap of a polyphase induction motor is constant, and the magnitude and frequency of the induced secondary or rotor voltage are each dependent upon the difference in speed between the rotating magnetic field set up by excitation of the primary windings and the speed of the rotor in space. The magnitude of the induced rotor voltage at standstill is equal to the magnitude of the supply voltage, if it is assumed that the motor has a transformation ratio of unity, and the frequency of the induced rotor voltage at standstill is equal to the frequency of the source of supply.

During acceleration of the motor by motor action, both the frequency and magnitude of the rotor voltage decrease in accordance with the increase in speed of the rotor so that, at normal operating speeds as a motor, the induced rotor voltage becomes extremely small and of low frequency, and at synchronous speed the rotor voltage is zero. If the motor is driven above synchronous speed in the direction of its rotating field, the magnitude and frequency of the rotor voltage increase in accordance with the speed, becoming, at twice synchronous speed, again equal, respectively, to the magnitude and frequency of the source. If the motor is driven in a direction opposite to the direction of its rotating field, the magnitude and frequency of the rotor voltage increase in accordance with increase in speed, becoming, at synchronous speed, equal to twice the magnitude and frequency of the source. Both the magnitude and frequency of the induced rotor voltage under motoring operations thus vary inversely with the speed up to synchronous speed, directly with the speed at speeds above synchronism when the motor is driven in the direction of its field rotation, and directly with speed at all speeds when the motor is driven opposite to the direction of its field rotation.

Since both the magnitude and frequency of the rotor voltage vary concurrently in the same direction with respect to each other, an ordinary inductive relay cannot be made responsive to the variations. The reason for this is that, as the frequency declines, there is a tendency for more relay current to flow through the inductive circuit, but, since the voltage is concurrently declining, the relay current remains substantially constant. The same result occurs if the frequency and voltage are concurrently increasing.

It is well known to use a series resonant control circuit including a relay coil and capacitor connected for energization to the rotor circuit of an induction motor. At standstill the current through the relay coil is sufficient to cause the relay to pick up. During acceleration of the motor in the direction of its rotating field, because of the phenomenon of series resonance, the current through the relay coil decreases sharply at a predetermined frequency and magnitude of rotor voltage, and the relay then drops out to perform a control function upon the motor.

It is also known to utilize in a single relay circuit a phenomenon of series resonance with a phenomenon of parallel resonance on one side of the series resonant condition. In prior known circuits having the additional resonant condition, a reactor is connected in parallel with the capacitor of a series resonant circuit like that just described, and parallel resonance occurs at frequencies less than the series resonant frequency. This results in a sharper change in the relay current under electrical conditions in which the voltage and frequency are lower than the value at series-resonance, but causes the relay current to be greater under electrical conditions in which the voltage and frequency are higher than the series-resonant values.

The improved control circuit of this invention also utilizes a phenomenon of series resonance with a phenomenon of parallel resonance, but with parallel resonance occurring on both the high and the low frequency sides of the series-resonant condition instead of on only one side.

The improved circuit includes a first parallel combination including a first reactor and a first capacitor connected in parallel with each other, a second parallel combination including a second reactor connected in parallel with a second capacitor, and connections connecting the two parallel combinations in series with each other. When the control circuit is connected to a supply circuit in which the voltage and frequency are varying concurrently in the same direction, the first reactor and the first capacitor are adapted to become parallel resonant at a predetermined electrical condition of relatively low voltage and frequency, the second reactor and the second capacitor are adapted to become parallel resonant at a different predetermined electrical condition of higher voltage and frequency, and the first parallel combination and the second parallel combination are adapted to become series resonant with respect to each other at an electrical condition in which the voltage and frequency are intermediate the voltage and frequency of the two parallel resonant conditions.

By a novel selection and interrelation of the reactances of the circuit components to be described herein, less current flows through the first reactor than would normally be expected when both the frequency and voltage are higher than the series-resonant value, and under electrical conditions in which both the frequency and voltage are lower than the series-resonant value, a relatively small current also flows through the first reactor, whereas, at the series resonant value, a relatively large current flows through the first reactor. For this reason, if the first reactor is a relay coil, as in the illustrative example, the relay current, when the control circuit is connected to a rotor circuit of an induction motor, can be made large at standstill, and small at any rotor speed irrespective of the relative direction of rotation of the rotor and the rotating field of the motor. Electrical responsive means other than a relay, if associated with the first reactor, would correspondingly be positively actuated by such definite and great changes in current flow.

One of the principal objects of the present invention is to provide a new and improved control means responsive to the electrical condition of a circuit in which the frequency and voltage are varying concurrently in the same direction.

A correlative object is to provide a new and improved control means responsive to the electrical condition of a secondary circuit of an alternating current motor for controlling the operation of the motor in accordance with said condition.

Another object is to provide, in combination with a series-parallel resonant control circuit in which there is one series resonant condition and one parallel resonant condition, a means for causing the circuit to become parallel resonant at two conditions having frequencies both above and below the series-resonant frequency, respectively.

Another object is to provide a control circuit which, when connected for energization from a supply circuit in which the voltage and frequency are varying concurrently in the same direction, becomes series resonant under some electrical conditions of the supply circuit and parallel resonant under two other electrical conditions of lower and higher frequency, respectively, than the series-resonant frequency.

A further object is to provide a resonant control circuit responsive to the electrical condition of a secondary circuit of an alternating current motor for controlling the operation of the motor and which becomes resonant at three different electrical conditions of the secondary circuit.

A further object is to provide an improved resonant relay circuit which, when connected for energization to a secondary circuit of an alternating current motor, is so sensitive to variations in the electrical condition of the secondary circuit as to be unaffected by the usual variations in relay characteristics and in supply voltage.

A more specific object is to provide a relay circuit including a reactor and a capacitor connected in parallel with each other and in series with a relay coil which is also connected in parallel with another capacitor, the parallel-connected reactor and capacitor combination being adapted to become parallel resonant when a predetermined voltage of a predetermined frequency is impressed on the circuit, the combination including the relay coil and its parallel connected capacitor being adapted to become parallel resonant at a different voltage and frequency, and the two parallel-connected combinations being adapted to become series resonant in cooperation with each other when a different predetermined voltage of a different predetermined frequency intermediate the others is impressed on the circuit.

A further specific object is to provide an improved control circuit responsive to variations in the electrical condition of the secondary circuit of an induction motor as the motor approaches zero speed.

Other objects and advantages will become apparent from the following specification, wherein reference is made to the drawings, in which:

Fig. 1 is a simplified wiring diagram illustrating the invention;

Fig. 2 is a simplified wiring diagram illustrating one way in which the invention may be used for controlling the operation of a wound rotor induction motor; and Fig. 3 is a graph showing comparative frequency and current response curves of the present invention and the prior art.

In Fig. 1, 10 represents a source of electrical energy having a variable electrical condition in which the voltage and frequency vary concurrently in the same direction. This interrelation of voltage and frequency occurs in the output from a synchronous generator as it comes up to speed, and also is present in the secondary circuits of polyphase induction and synchronous motors during acceleration and deceleration. A reactor 11, capacitors 12 and 13, and an additional reactor device illustrated as an operating winding 14w of a relay 14 are connected in a control circuit 15 across the source 10. The reactor 11 and the capacitor 12 are connected in parallel with each other and in series with the winding 14w. The capacitor 13 is connected in parallel with the winding 14w and in series with the parallel connected reactor 11 and capacitor 12. The relay 14 may have any desired contact arrangement for controlling a device in accordance with the electrical condition of the source 10, but is shown as having only a single normally closed contact 14a.

Referring to Fig. 3, a curve A is a typical current-frequency response curve for a simple series resonant circuit under a variable electrical condition in which the voltage and frequency vary concurrently in the same direction. It will be noted that the curve A, on both sides of the resonance point m, slopes gradually over a wide range of frequencies with the lesser slope on the high frequency side of resonance. It is true that by lowering the resistance of such a control circuit, the slope of the curve on both sides of resonance could be made steeper, but from the practical standpoint of an operative control circuit design, this is not feasible. The series circuit thus finds its greatest usefulness for applications in which the relay is picked-up in the higher frequency ranges and drops out at some point such as n on the lower frequency side of resonance, as the frequency and voltage concurrently decrease.

A series resonant circuit gives minimum impedance at resonance for a fixed total resistance, and, as is well known, parallel resonance gives maximum impedance at resonance for a fixed total inductance. This difference between the impedance of a series circuit and of a parallel circuit at resonance is of great importance in radio, as by its use it is possible to tune a radio receiver so that it will respond to a definite frequency and at the same time suppress an undesirable frequency.

Because of the inherent high resistance of the operating winding of any electro-responsive device such as a relay sensitive enough to respond to variations in the electrical condition of the secondary circuit of an alternating current motor, the slope of the current-frequency curve on the higher frequency side of resonance in a series resonant circuit cannot be made steep enough for all purposes. Prior known series-parallel resonant circuits with a relay coil in series with a parallel combination of a reactor and a capacitor, and tuned to give series resonance at, for instance, 60 cycles, and parallel resonance at a lower frequency, provide a steeper drop in current on the lower frequency side of resonance than is obtainable with a simple series resonant circuit. However, the relay current on the higher frequency side of the resonance point in prior series-parallel circuits remains at an extremely high value, thus rendering the circuit unsuitable for certain applications in which the relay must pick up at a predetermined frequency when the frequency is decreasing. This disadvantageous result can be explained by the fact that the parallel combination at voltages and frequencies above resonance is capacitive and has a greater capacitive effect than if the capacitor alone were present, resulting in a lower total impedance at all frequencies above resonance. A curve B in Fig. 3 is a typical current-frequency curve for prior series-parallel resonant control circuits. Although a steep drop in current on the lower frequency side of resonance is obtained as indicated at p, the current on the higher frequency side is relatively large as indicated at g.

The current-frequency curve for a circuit like that of the circuit 15 of Fig. 1 is indicated at C in Fig. 3. Note that the relay current is extremely low at all frequencies within the operating range above series resonance m in a region r, increases suddenly at resonance as indicated at s, and then drops fairly rapidly along a portion t at lower frequencies. This characteristic of the relay circuit 15 makes it ideally suited for application such as the one now to be described.

One way in which the control circuit 15 of Fig. 1 can be used to control an induction motor is shown in Fig. 2 which is illustrative of an elementary plug-to-stop controller. It is understood that several steps of acceleration can be provided by merely using extra contactors and relays as is well known in the art. A control system using several series resonant relay circuits for the control of acceleration is disclosed for example in Leitch Patent No 2,165,491.

In Fig. 2, a motor 20 is shown as a three phase wound rotor induction motor provided with a Y-connected secondary resistor 21 a portion of which may be by-passed by means of a two-pole electromagnetic contactor 22 having an operating winding 22w. The primary winding of the motor 20 is arranged to be connected to a source of polyphase power, indicated by conductors L1, L2, and L3, by means of a three-pole electromagnetic contactor 25 for operation as a motor and by means of a three-pole electromagnetic contactor 26 for stopping by plugging action. The contactor 25 has an operating winding 25w, normally open control circuit contacts 25a and 25b, and normally closed control circuit contacts 25c. The contactor 26 has an operating winding 26w, normally closed control circuit contacts 26a, and normally open control circuit contacts 26b. A series-resonant relay circuit 27 which includes a control relay 28 having an operating winding 28w and normally closed contacts 28a is provided to control the contactor 22. The relay circuit 27 is of the series-resonant type as described in the aforementioned Leitch patent and includes a capacitor 29 connected in series with the winding 28w across potentiometer resistors 30 supplied from one leg of the secondary resistor 21.

The control circuit 15 which is the same as that shown in Fig. 1 forms a part of the control system of Fig. 2 and like parts thereof are referred to by like reference characters. The control circuit 15 is energized from the seconday circuit of the motor 20 through a pair of series-connected potentiometer resistors 31 which are connected across one leg of the resistor 21. Other means for connecting the control circuit 15 to the secondary circuit may be employed, such as, for example, by a connection across two terminals of the secondary winding or across only a portion of one leg of the resistor 21.

Operation of the system is controlled by a pair of momentary contact push buttons 34 and 35. The push button 34 is the start push button and has normally open contacts 34a and the push button 35 is the stop push button and has normally closed contacts 35a and normally open contacts 35b. A momentary contact push button 36 having normally closed contacts 36a may be provided to permit stopping of the motor without plugging and to deenergize the contactor 26 in event of a failure of the contacts 14a or 35b to open.

In operation of the control system of Fig. 2, closure of the push button 34 completes a circuit from the conductor L2 through the contacts 36a, 35a, 34a, and 26a and the winding 25w to the conductor L3 causing closure of the contactor 25 and thus connecting the motor 20 to the source of power for acceleration from standstill. Closure of the contacts 25a completes a holding circuit around the contacts 34a. As soon as power is applied to the motor, the relay 28 opens its contacts 28a to prevent immediate closure of the contactor 22. When a predetermined speed is reached, the contacts 28a reclose because of impairment of resonance of the relay circuit 27 and an operating circuit for the winding 22w is completed through the contacts 36a, 35a 25a, 25b, and 28a. Closure of the contactor 22 by-passes a portion of the resistor 21 permitting the motor to accelerate to near synchronous speed.

When it is desired to stop the motor 20 by plugging, the push button 35 is operated. Opening of the contacts 35a deenergizes the contactors 25 and 22. The contactor 25 thereupon opens to remove power from the motor and the contactor 22 opens to insert all of the resistor 21 into the secondary circuit. As soon as the contacts 25c reclose, an energizing circuit is completed through the contacts 36a, 35b, 25c and 14a for the winding 26w. The contactor 26 thereupon operates to apply reverse power to the motor. At the instant of closure of the contactor 26, the frequency of the induced rotor voltage is at some magnitude above the frequency of the source, the actual value of the frequency as well as the magnitude of the rotor voltage depending upon the actual speed of the motor 20. The rotor frequency decreases as the motor decelerates and, at or near standstill, the relay 14 operates to open its contacts 14a. This causes opening of the contactor 26 and removes power from the motor 20 so that the motor stops and either does not reverse at all or reverses but slightly depending upon the operating frequency selected for the circuit 15.

Referring again to Fig. 3, when the motor 20 is operating as a motor with the contactor 25 closed, the rotor frequency is below the value indicated at m, and the current in the relay winding 14w is as indicated by the portion t of the curve C. The relay 14 picks up at low speed, but has no operative effect because the circuits including its contacts are open at 25c. At higher forward speeds, the relay 14 drops out. If the relay 14 is in its dropped-out condition when the contacts 35b close, the contactor 26 operates upon closure of the contacts 25c. At the instant of closure of the contactor 26, the rotor frequency substantially instantaneously becomes at some value above m, and the relay 14 remains dropped out until the frequency m is reached. Should the push button 35 be operated when the motor 20 is operating at such a slow speed that the relay 14 is picked up, opening of the contactor 25 causes deenergization of the relay 14. Closure of the contacts 14a then cause pick up of the contactor 26 and plugging proceeds as before.

A response curve like that of C of Fig. 3 is obtained with the resonance point m at about 60 cycles when the reactor 11 has an inductance of 0.8 henry and the winding 14w has an inductance of 1.2 henries at low volts per cycle which drops because of saturation to about 0.85 henry at higher volts per cycle near the pick up value, and the capacitors 12 and 13 have capacities of 2 and 15 microfarads, respectively.

When a relay circuit having these values is connected to a motor supplied from a 60 cycle per second source, the portion of the circuit including the reactor 11 and the capacitor 12 is parallel resonant at about 126 cycles per second. The impedance of this branch is inductive and is of decreasing value as the frequency decreases from 126 cycles. The portion of the circuit including the capacitor 13 and the winding 14w is parallel resonant at about 38 cycles and is a capacitive impedance as the frequency decreases from higher values towards 38 cycles. At a frequency of about 50 or 51 cycles, series resonance would occur and maximum voltage would appear across both the reactor 11 and the relay winding 14w if it were not for the slight reduction in inductance that occurs when the flux density in the iron of the relay 14 and the reactor 11 is high. The reduction in the inductance of the coil 14w makes the equivalent impedance of the entire circuit correspond to a lower inductance. This increases the series resonance of the system to 60 cycles per second.

It is to be understood that the foregoing numerical values are given for purposes of explanation only, it being apparent that other values providing the same or similar operations within the same or other frequency ranges can readily be selected within the scope of this invention.

The control circuit of this invention is practically insensitive to voltage transients since a sudden rise in voltage at the source 10 of Fig. 1 is absorbed principally across the capacitor 12 instead of across the smaller capacitor 13.

While a certain preferred embodiment of the invention has been specifically described, it is understood that the invention is not limited thereto, as many variations will be readily apparent to those skilled in the art and the invention is to be given its broadest possible interpretation within the terms of the following claims.

I claim:

1. A control circuit consisting of a first capacitor and a first reactor which are connected in parallel and which are responsive to coexistent variations in the values of voltage and frequency, when said voltage and frequency are varying concurrently in the same direction, to change from one predetermined condition to a different predetermined condition, one of which conditions is parallel resonant and occurs at a first predetermined value of said voltage and frequency, and the other of which is not parallel resonant, and a second capacitor and a second reactor which are connected in parallel and which are responsive to said coexistent variations in the value of voltage and frequency to change from one predetermined condition to a different predetermined condition, one of which is parallel resonant and occurs at a second and different predetermined value of said voltage and frequency, and the other of which is not parallel resonant, means free from substantial operative impedance connecting said parallel combinations in series with each other, said combinations being related to each other in electrical characteristics so as to become series resonant with respect to each other at a third predetermined value of voltage and frequency, an electromagnetic relay adapted to be connected to, and to control, an extraneous circuit, one of said reactors being the coil of said electromagnetic relay, said coil and its parallel-connected capacitor being operative to become parallel resonant at one of said first and second predetermined values of voltage and frequency, and said control circuit being adapted to be connected to an electromagnetic device for energization in response to changes in the electrical condition of said electromagnetic device.

2. A control circuit according to claim 1 wherein said third predetermined value is intermediate the first and second predetermined values.

3. A control circuit according to claim 1 wherein said one of said first and second predetermined values of voltage and frequency is the one having the lower frequency.

4. An electromagnetic device, a control circuit operatively connected to, and responsive to the electrical condition of, the device, said control circuit consisting of a first capacitor and a first reactor which are connected in parallel and which are responsive to coexistent variations in the values of voltage and frequency, when said voltage and frequency are varying concurrently in the same direction, to change from one predetermined condition to a different predetermined condition, one of which conditions is parallel resonant and occurs at a first predetermined value of said voltage and frequency, and the other of which is not parallel resonant, and a second capacitor and a second reactor which are connected in parallel and which are responsive to said coexistent variations in the value of voltage and frequency to change from one predetermined condition to a different predetermined condition, one of which is parallel resonant and occurs at a second and different predetermined value of said voltage and frequency, and the other of which is not parallel resonant, means free from substantial operative impedance and connecting said parallel combinations in series with each other, said combinations being related to each other in electrical characteristics so as to become series resonant with respect to each other at a third predetermined value of voltage and frequency, an electromagnetic relay, means controlled by the relay to change said electrical condition of the device, one of said reactors being the coil of said electromagnetic relay, and said coil and its parallel-connected capacitor being operative to become parallel resonant at one of said first and second predetermined values of voltage and frequency.

References Cited in the file of this patent

UNITED STATES PATENTS

| | | |
|---|---|---|
| 2,021,753 | Suits | Nov. 19, 1935 |
| 2,040,763 | Summers | May 12, 1936 |
| 2,661,459 | Schmidt | Dec. 1, 1953 |
| 2,768,351 | Scholten et al. | Oct. 23, 1956 |